United States Statutory Invention Registration [19]

[11] Reg. Number: H167

Forster et al. [43] Published: Dec. 2, 1986

[54] PROJECTILE OBTURATOR

[75] Inventors: James J. Forster, Socorro, N. Mex.; Chester J. Kobialka, Landing; Sung Cho, Hackettstown, both of N.J.

[73] Assignee: The United States of America as represented by the Secretary of the Navy, Washington, D.C.

[21] Appl. No.: 854,212

[22] Filed: Apr. 18, 1986

[51] Int. Cl.[4] ..... F42B 31/00

[52] U.S. Cl. ..... 102/524; 102/529; 102/442

[56] References Cited

U.S. PATENT DOCUMENTS

| | | | |
|---|---|---|---|
| 4,242,961 | 1/1981 | Moredock et al. | 102/93 |
| 4,532,868 | 8/1985 | Gleichaut et al. | 102/527 |
| 4,552,071 | 11/1985 | Horais et al. | 102/527 |

*Primary Examiner*—Harold J. Tudor
*Attorney, Agent, or Firm*—R. F. Beers; T. E. McDonnell; E. E. Goshorn

[57] ABSTRACT

An improved multipurpose projectile obturator of composite, frangible construction where the obturator preferably forms part of a projectile that is launched from an upstanding tube. The tube interior is provided with an alternating series of helically arranged groove and land means. A projectile at its propellant end is provided with an annular shoulder that faces in a direction toward the propellant end. An obturator is generally made up of an elastomeric band of a suitable grade of rubber. The band in being placed about the projectile surface and against the shoulder is positively retained as the projectile is inserted in the tube and launched therefrom. The outer periphery of the band has an annular groove for receiving a ring-like element. This element is preferably of three-ply construction and is also preferably made up of two half sections that are suitably bonded to the groove about the band periphery. The outer ply of the element is provided with a plurality of bristle or wire-like elements for wipingly engaging the series of land means when the projectile is inserted in the tube. Also, each wire-like element of the plurality extends at an oblique angle and in a counterclockwise direction when viewed from the warhead end of the projectile. The projectile is provided with a series of helically extending and circumferentially spaced rib means for slidably engaging interior surface portions of the tube when the projectile is inserted in the tube. The series of wire-like elements in engaging the series of land means not only clean propellant residue buildup therefrom but also cooperate with the rib means in stabilizing the projectile in its inserted oriented position without binding engagement as it is lowered into the tube. When the projectile is initially launched from the tube, the trailing peripheral wedge-shaped and longitudinally slotted edge of the obturator assists in fully separating the obturator from the projectile so as to minimize projectile drag.

23 Claims, 9 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROJECTILE OBTURATOR

This invention relates to a projectile obturator; and, more particularly, to an improved multi-purpose projectile obturator of composite and frangible construction.

BACKGROUND OF THE INVENTION

Various projectile obturators have been designed in the past for assisting in various ways the launch of a projectile from a barrel, tube, and the like. For example, U.S. Pat. No. 4,242,961 discloses an obturator. The obturator base portion is generally made up of an elastomeric and nonmetallic material and of endless belt-like configuration for mounting in a groove as provided on the surface exterior of a projectile at its propellant end. By reason of the belt-like portion being mounted in the projectile groove, the obturator rotates relative to the projectile during launch thereby minimizing barrel rifling effects and rotation of the projectile about its axis. The outer peripheral portion of the base portion is provided with a series of annular and relatively spaced lips of chevron-like configuration in radial section for wipingly engaging the barrel interior surface so as to seal the propellant gases in the barrel thereby maximizing the performance of the projectile as it is launched from the barrel and moves along its intended trajectory to a designated target. The obturator may be of reinforced construction in providing annular extending fibers within the grooves between adjacent lips of the series thereof. U.S. Pat. No. 4,532,868 discloses a high performance projectile for use in a rapid, repetitive fire weapon and the like. The projectile is provided with an exterior band mounted in an annular groove of the projectile. One of the purposes of the band is to facilitate sliding action of the projectile in the weapon barrel. The band species of FIGS. 1–5 is considered pertinent and is of composite construction. The band is comprised of a base of ferrous, nonferrous material or an alloy thereof. The base is affixed to the projectile. The core of the band is made from tin bronze powder and polytetrafluoroethylene such that the polytetrafluoroethylene is scattered throughout the matrix of the nonferrous material in the form of ball-shaped elements. The exterior surface of the composite core is covered by a sheath or skin of polytetrafluoroethylene material. U.S. Pat. No. 4,552,071 concerns another obturator of two-piece construction. The obturator is made up of a base ring portion of flexible Nylon material for mounting in an annular groove on the exterior surface of a projectile between its ends. The bottom of the groove throughout its periphery is inclined such that the ring is in a lowered, retracted position when the projectile is loaded into a gun barrel. The outer surface of the ring is provided with a groove for receiving a narrow band of relatively hard Nylon material. The diameter of the outer surface of the band is such that it slidably engages and engraves itself upon the lands and grooves of the barrel as the projectile is inserted into the barrel with the obturator in a retracted position. The forward end of the ring is provided with a pair of relatively spaced annular lips. When the projectile is fired for launching from the barrel, the ring is advanced up the ramp to its extended position so that the lips extend radially outward so as to sealingly and wipingly engage the lands and grooves of the barrel interior. Since the ring is slippingly coupled to the ramp, spin rotation of the projectile is minimized as it is fired and launched from the barrel. However, none of the aforediscussed references, whether taken alone or in any combination, remotely suggest an improved multipurpose and preferably frangible projectile obturator of composite construction having, among other things, the purpose of maintaining a projectile in its initially oriented position when it is inserted in the barrel for cleaning (removing) propellant residue buildup, especially from the lands of a barrel interior, as the result of previous firing of another projectile. The obturator also provides a positive pressure seal between the obturator and the barrel when the projectile is fired, and then it fully separates itself, and drops away from the projectile after it is launched.

SUMMARY OF THE INVENTION

An object of the invention is to provide an improved projectile obturator that results in no noticeable wear on the barrel interior despite repeated cleaning action by each improved obturator as each projectile is loaded in the barrel.

Another object of the invention is to provide an improved obturator of easily assembled and readily available components that advantageously functions to maintain its initially oriented position as inserted in the barrel interior without impairing its cleaning and sealing actions as the projectile is loaded in and launched from the barrel.

Still another object of the invention is to provide an improved projectile obturator that eliminates, for all practical purposes, the possibility of a projectile becoming jammed in a barrel and the danger to personnel in attempting to release the jammed projectile.

In summary, the improved multipurpose projectile obturator of frangible and composite construction is generally made up of a band of elastomeric material that is disposed about an annular surface of the projectile and against an annular shoulder thereof. The band has an inside diameter smaller than the outside diameter of the annular surface so as to be frctionally retained thereon. The annular shoulder faces in a direction toward the propellant end of the projectile so as to positively retain the band on the projectile when the projectile is inserted in the tube. The projectile is also provided with a series of relatively spaced ribs about its periphery for slidably engaging interior surface portions in the series of groove means of the alternating series of land and groove means of the barrel interior. The ribs are advantageously interposed between the obturator and the intermediate casing section of the projectile. Inasmuch as the land and groove means are spiraled or helixed between the barrel interior ends, the series of ribs are also arranged in a corresponding helix. The direction of the helix of both the series of ribs and land and groove means is such that the projectile is spun clockwise about its axis when loaded into the barrel or tube from its muzzle end.

Each groove means of the groove and land means is generally of channel-like shape in longitudinal extent but of novel shape in transverse section such that each groove at one circumferential end is narrower depthwise than at the other circumferential end. Similarly, each rib of the series of ribs is of unique tapered configuration in transverse section. To this end, the outer surface of each rib is substantially flat and extends tangentially and radially outward in a clockwise direction so that one longitudinal edge portion of each rib is of less thickness than the other longitudinal edge portion. The thicker or raised edge portion is the forward edge portion of each rib when the projectile is viewed from its warhead end. The series of ribs advantageously correspond in number to the series of grooves.

The obturator ring on its outer peripheral surface between its ends is provided with an annular groove. A band is affixed to this groove. The outer surface of this band is provided with a series of uniformly spaced wire-like needle elements that are arranged circumferentially and widthwise of the band. Each element of the series in being inserted in the outer surface of the band is such that the exposed end of each element extends a predetermined and uniform distance above the band outer surface while at the same time each element extends at an oblique angle in relation to the band outer surface. The exposed end of each element in extending at an oblique angle in relation to the band extends in a counterclockwise direction when the projectile is viewed from its warhead end. The outer diameter of the series of inserted elements is such that it is greater than the interior diameter of the series of land means within the barrel interior. At the same time the outside diameter of the ring, even with the band affixed in the groove thereof, is less than the interior diameter of the series of land means.

By reason of each wire-like element being made up of tough spring-like material, circumferentially spaced sections of wire-like elements of the series of wire-like elements wipingly engage the series of land means when the projectile is inserted in the barrel and slides down the barrel under the influence of gravity to its firing position for launch. Moreover, the spaced sections of wire-like elements in wipingly engaging the series of land means advantageously remove propellant residue buildup. At the same time, the series of wire-like elements in wipingly engaging the series of land means in conjunction with the series of rib means slidably engaging interior surface portions of the barrel within the series of grooves thereof advantageously cooperate to maintain the projectile in concentric relation within the barrel. Since the wire-like elements extend in a counterclockwise direction, it prevents counter clockwise rotation of the projectile about its axis as the result of the influence of gravity when the projectile slides down the barrel. This prevention of projectile rotation also prevents jamming of each rib means in the shallow part of its associated groove means and thus locking of the projectile in the barrel.

When the projectile slides to its firing position in the barrel and is ignited for launch from the barrel, the propellant gases expand the trailing peripheral wedge-shaped edge of the obturator ring radially outward into sealing engagement with the land and groove means of the barrel so as to maximize trajectory performance of the projectile when it is launched free of the barrel. The ring is also provided with at least a pair of diametrically opposed slots along its trailing edge. The slots assure fracture of the obturator ring and separation thereof from the launched projectile so as to enhance the projectile aerodynamic characteristics during flight.

Other objects and advantages of the invention will become apparent when taken in conjunction with the accompanying drawings and specification.

DETAILED DESCRIPTION OF THE INVENTION

Figure 1:
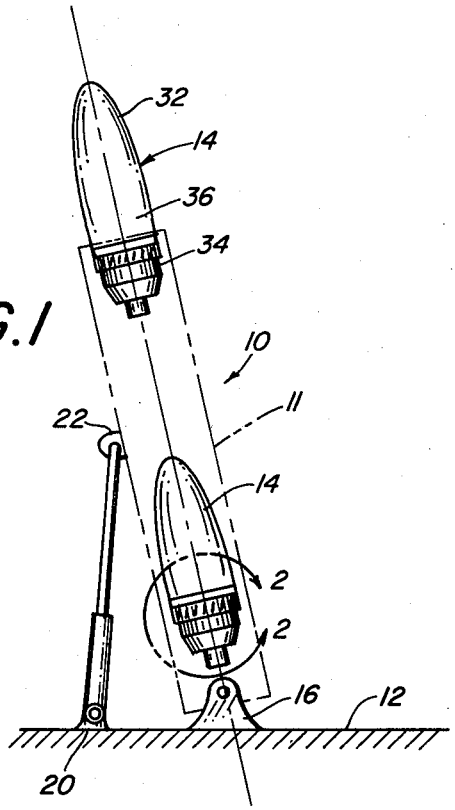
FIG. 1 is a diagrammatic view in dotted and solid lines of an embodiment of the invention that relates to an improved portable weapon for launching a novel projectile wherein the projectile is illustrated in both loading and firing positions.

With further reference to FIG. 1, an improved mortar 10 having a launch tube 11 is mounted in an upstanding inclined position on top of its ground support 12 for launching a novel mortar or projectile 14 to strike a target (not shown). Tube 10 at its lower end is hingedly connected to its base support 16. Tube 10 is maintained in its desired inclined position by any suitable means, such as an adjustable telescopic rod arrangement 18, the lower end of which is hingedly connected to its base support bracket 20. The upper end of arrangement 18 is hingedly connected to an intermediately disposed bracket 22 on tube 10 as illustrated in FIG. 1.

Figure 2:
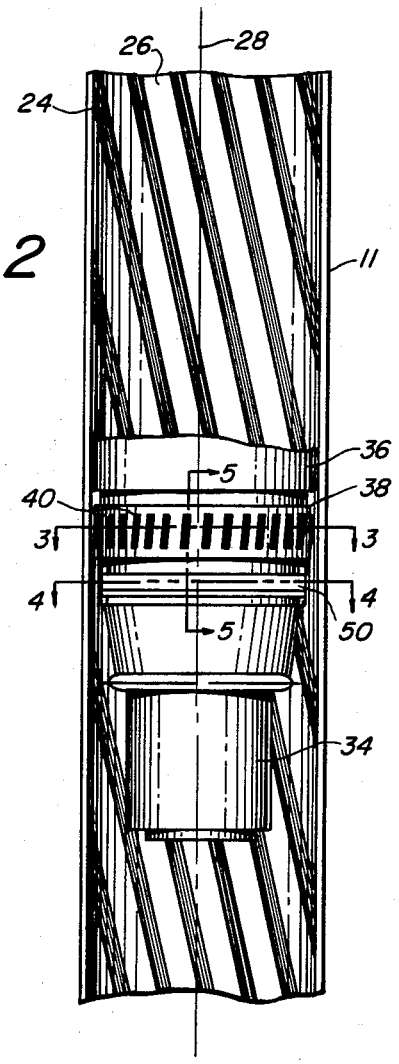
FIG. 2 is an enlarged longitudinal sectional view with parts added and other parts broken away as taken within the bounds of encompassing line 2—2 of FIG. 1 and illustrates further details of the invention.
Figure 4:
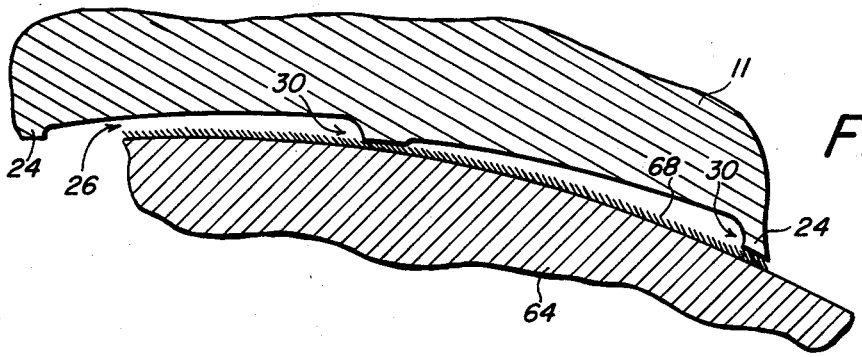
FIG. 4 is another enlarged fragmented cross-sectional view as taken along line 4—4 of FIG. 2.
Figure 3:
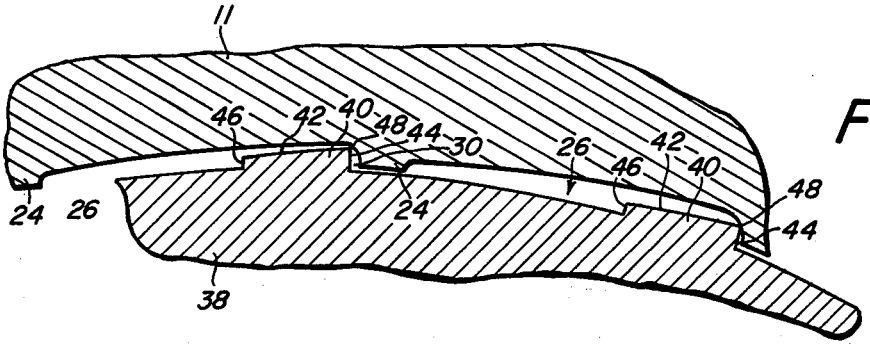
FIG. 3 is an enlarged fragmented cross-sectional view as taken along line 3—3 of FIG. 2.

The interior of tube 10 between its ends is provided with an alternating series of lands 24 and grooves 26 in the manner depicted in FIG. 2. These alternating series of lands 24 and grooves 26 are arranged concentrically about tube axis 28 and are also arranged in a spiral or helical fashion thereabout. As best shown in FIGS. 3 or 4, each land 24 is of rib-like configuration lengthwise of tube 11; and each groove 26 is of approximately channel-shaped configuration throughout its longitudinal extent between the ends of tube 11. However, each channel-shaped groove 26 in transverse cross-section is deeper in a radial outward direction at one circumferential end 30 than at the other circumferential end. Deeper end 30 of each groove 26 is at the right circumferential end thereof as viewed from the muzzle end of tube 11 and as shown in FIG. 4.

Projectile 14 has a conical-shaped warhead section 32 at its forward end, a propellant section 34 at its trailing end, and a casing section 36 for interconnecting the ends as depicted in FIG. 1. An annular groove (not shown) is provided about the outer periphery at the trailing end of section and transversely of projectile axis 28 for receiving a ring or band element 38 in the manner shown in FIG. 2. Element 38 is affixed in suitable fashion to section 36 within the groove thereof. A series of relatively and circumferentially spaced ribs 40 are formed about ring 38. The number of ribs of the series thereof on projectile 14 corresponds to the number of grooves 26 in the interior of tube 11. Each rib 40 is of a length shorter than the longitudinal extent of element 38.

Moreover, each rib 40 extends in a helical direction that corresponds to the helix of the alternating series of lands 24 and grooves 26. Each rib 40 in radial section is of tapered configuration. In other words, the top flat major surface 42 of each rib 40 projects tangentially in a clockwise direction from the outer peripheral surface of element 38 and at an oblique angle in relation to the outer peripheral surface thereof as viewed from the muzzle end of tube 11 and as depicted in FIG. 3. As the result of the inclination of surface 42, its forward or right edge portion 44 has a greater radial extent outwardly of element 38 than the trailing or left edge portion 46. The line of intersection 48 between surface 42 and edge portion 44 has a radius slightly less than the interior radius of each groove 26 at the deeper circumferential end thereof. As will become more apparent hereinafter, intersection line 48 of each projectile rib 40 is normally in sliding engagement with its associated interior surface portions of tube 11 that defines the deeper end of groove 26 as projectile 14 is lowered into tube 11, under the influence of gravity, and fired therefrom during use of weapon 10.

Figure 5:
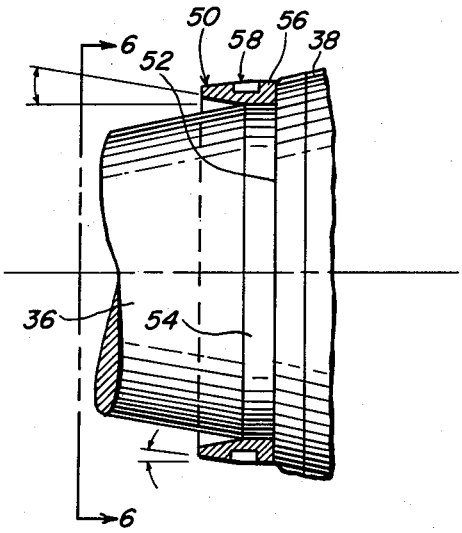
FIG. 5 is an enlarged fragmented longitudinal sectional view with some parts shown in section and other parts shown in schematic as taken along line 5—5 of FIG. 2.
Figure 6:
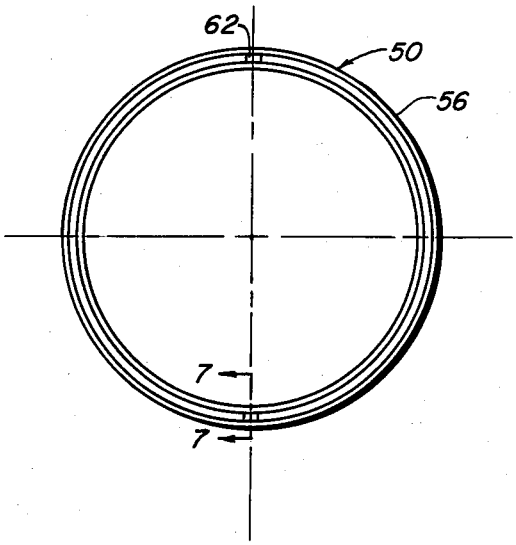
FIG. 6 is an elevational view with parts removed as taken along line 6—6 of FIG. 5.
Figure 7:
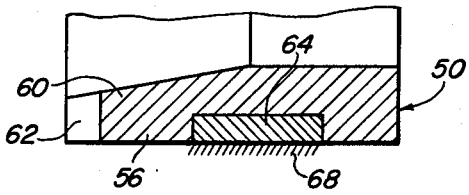
FIG. 7 is an enlarged cross-sectional view with parts added as taken along line 7—7 of FIG. 6.
Figure 8:
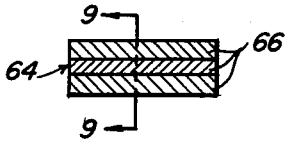
FIG. 8 is an enlarged cross-sectional view with parts added of one of the components of FIG. 7.

An obturator 50 of composite construction is affixed to projectile 14 between element 38 and projectile end 34 as shown in FIG. 2. At the trailing end of element 38 and slightly spaced therefrom, projectile 14 is provided with an inwardly extending annular shoulder 52 and cylindrical surface portion 54 of relatively narrow extent as illustrated in FIG. 5. Obturator 50 is generally made up of a ring-like base portion 56 that is made up of a suitable grade of rubber or elastomeric material. The interior diameter of base portion 56 is smaller than the diameter of surface portion 54. Consequently, when base portion 56 is assembled to surface portion 54 and disposed against shoulder 52, it is slightly stretched and frictionally retained thereon. The outer periphery of base portion 56 has an annular groove 58 of channel-shaped configuration between its ends as best shown in FIG. 7. Trailing peripheral edge 60 of base portion 56 has a wedge-shaped configuration in radial section as best shown in FIG. 7. The narrowest portion of edge 60 is provided with at least a pair of diametrically opposed longitudinally extending slots 62, the importance of which will become more apparent hereinafter.

Figure 9:
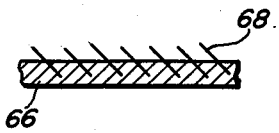
FIG. 9 is an enlarged fragmented longitudinal sectional view with parts added and other parts taken away as viewed along line 9—9 of FIG. 8.

Obturator 50 is also provided with an outer annular band element 64 inserted in groove 58 of base portion 56. Element 64 is preferably of three-ply construction and has an outside diameter substantially equal to the outside diameter of base portion 56 adJacent groove 58. Each ply 66 is preferably made up of a woven fabric material of suitable thickness and strength; such as, e.g., a suitable grade of cotton. The outermost ply 66 of element 64 has a plurality of wire-like and relatively short-length elements 68 of needle-like configuration inserted therein as best shown in FIG. 9. Moreover, each wire-like element 68 is preferably formed from narrow gauge wire such as, e.g., wire that is used in forming staples. The plurality of wire-like elements 68 in being inserted in outermost ply 66 are preferably arranged to be uniformly spaced both circumferentially and longitudinally of element 64 as shown in FIGS. 4 and 7 respectively. Further, in inserting each wire-like element 68 in outermost ply 66, each element 68 is inclined at an oblique angle in relation to the tangent to the outer circumferential extent of element 64 where the tangent intersects its associated inserted element at the insertion point to the outer surface of outermost ply 66. Further, each inserted element 68 is arranged to extend in a counterclockwise direction as viewed from the warhead end of projectile 14 as depicted in FIG. 4. Each wire-like element 68 of the obturator of a projectile 14 is preferably made up of a suitable grade of steel so as to exhibit satisfactory spring-like characteristics for wipingly engaging its associated interior surface portion of the respective land of the series of lands 24 for the purpose of effectively removing propellant residue buildup. At the same time the series of elements 68 in wipingly engaging the series of lands 24 in conjunction with the series of projectile ribs 40 slidably engaging tube surface portions at the deeper circumferential ends of the series of grooves 26 cooperate to maintain projectile 14 in its oriented concentric position in tube 11 as will become more apparent in connection with an operative embodiment of projectile 14 in being inserted and launched from tube 11. Moreover, the exposed end of each inserted and inclined element 68 is such that it is disposed a predetermined and substantially uniform radial distance outward of the outer periphery of band 64 so that the outer diameter about the outer ends of the inserted wire-like elements 68 is greater than the interior diameter of lands 24 in tube 11.

One method for forming band 64 about base portion 50 is to mount the base portion on a suitable support such as a mandrel (not shown). To this end, a web of a suitable grade and thickness of woven fabric material such as cotton is cut into a series of narrow strips or plies, with the width of each strip having a width slightly less than the longitudinal extent of groove 58. Certain strips of the series have a series of wire-like elements 68 inserted therein so as to have a uniform density of elements 68 lengthwise and widthwise thereof as illustrated in FIGS. 4 and 9. It is noted here that the uniform density of elements 68 should be such that the inserted elements provide a tuft-like cluster for effectively cleaning propellant residue from the series of lands 24 in accordance with the invention as will be more fully explained below. Then all web strips are cut to a length substantially corresponding to either the circumference or half the circumference about groove 58. Then two plies without elements 68 are wrapped about and disposed in groove 58. Finally, the outer ply with inserted elements 68 is wrapped about the previously applied second ply 66 such that elements 68 are oriented in the manner shown in FIG. 4. Lastly, a suitable resin such as, e.g., an epoxy, is applied to the series of three wrapped plies 66 so as to firmly bond these plies to base portion 50 within its groove 58 while at the same time the inserted ends of the series of elements 68 are firmly anchored to outer ply 66.

In an operative embodiment of mortar 10, the user erects same in a desired upstanding inclined position as shown in FIG. 1. Then the user inserts projectile 14 into the muzzle end of tube 11 so that each rib edge portion 48 is slidably engaging interior surface portions at the deeper end of its associated groove 26 in tube 11 immediately adjacent its associated land 24 therein while circumferentially spaced portions of the series of wire-like elements wipingly engage the series of lands 24. Because of the counterclockwise orientation of elements 68 as projectile is lowered into tube 11, under the influence of gravity, the projectile is prevented from rotating counterclockwise about its axis 28 as viewed in FIGS. 1–2 and 4. At the same time as the projectile is lowered into tube 11, the spaced sections of elements 68 wipingly engage the series of lands 24 throughout their length so as to remove propellant residue buildup as the result of launching a previous projectile from tube 11 during weapon use. Also, it has been found that the hardness of the material from which tube 11 is made is such that lands 24 do not exhibit any noticeable wear despite the wiping action of elements 68 as a projectile 14 is repeatedly loaded and fired from the tube. Moreover, since the counterclockwise orientation of the spaced circumferential portions of elements 68 in engaging the series of lands 24 prevents counterclockwise rotation of projectile 14 about its axis, the spaced circumferential portions of elements 68 in engaging the series of lands 24 also cause the projectile 11 to follow the helix profile of each land 24. As the result of the projectile following the helix profile of lands 24 as it is lowered into tube 11, projectile 14 partially rotates in a clockwise direction (as viewed from the tube muzzle end) until it reaches the bottom of the tube. It is noted here that the sliding engagement of each rib edge portion 48 with its associated channel surface portion in conjunction with the spaced circumferential portions of the series of elements 68 in engaging the series of lands cooperate to stabilize and maintain projectile axis 28 in substantially coaxial alignment with the axis of tube 11. One of the advantages of the circumferentially spaced portions of elements 68 in engaging the series of lands 24 is that these spaced portions of elements 68, because of their spring-like characteristics, cooperate to maintain projectile 14 in concentric relation to tube 11 despite any tolerance variations between the interior of tube 11 and projectile 14.

When loaded projectile 14 reaches the bottom of tube 11 and is fired for launch, the projectile rotates in a counterclockwise direction in following the helix of the series of lands 24. At the same time, the exhausting explosive gases of the propellant act on peripheral trailing edge 60 of ring 50 and force this trailing edge to expand radially outward into relative seal-tight sliding engagement with the series of lands and grooves 24 and 26 about the tube interior. Such sealing engagement, of course, positively retains propellant gases in tube 11 until projectile 14 is launched therefrom. When the projectile is initially launched from tube 11, the propellant gases are still forceful enough in acting on the outwardly expanded and tube-released trailing edge 60 of ring 50 so as to ultimately cause fracture of ring 50 into at least two sections. As the result of this fracture, ring 50 not only is fully separated from launched projectile 14, but the projectile completes its trajectory to a target (not shown) without the drag effects of ring 50. By reason of diametrically opposed slots 62 in ring 50, fracture of the ring into at least two pieces is assured.

Obviously many modifications and variations of the present invention are possible in light of the above teachings. It is therefore to be understood that, within the scope of the appended claims, the invention may be practiced otherwise than as specifically described.

What is claimed is:

1. An obturator of composite construction for use on a projectile launched from an upstanding tube, the interior surface of the tube between its ends having an alternate series of land and groove means, said obturator comprising:

circular-like band means mounted on peripheral surface means of a projectile adjacent the propellant end thereof, the band means having annular groove means in the outer periphery thereof, annular shoulder means provided on the projectile and facing in a direction toward the propellant end of the projectile so as to positively retain the obturator on the projectile when it is inserted in the tube, ring means mounted in the groove means, a series of relatively spaced bristle-like means being arranged about the ring means such that one end of each bristle-like means is inserted in the outer peripheral surface of the ring means while at the same time the outer end of each bristle-like means being disposed above the outer peripheral surface of the ring means, and resin means for affixing the ring means to the band means while at the same time affixing the inserted end of each bristle-like means of the series thereof in order that the outer ends of certain bristle-like means of the series of bristle-like means wipingly engage the series of land means so as to cause cleaning of the series of land means of propellant residue from a prior projectile inserted in the tube and launched therefrom.

2. An obturator as set forth in claim 1 wherein the band means is composed of an elastomeric material.

3. An obturator as set forth in claim 1 wherein the band means is provided with trailing peripheral edge means that is spaced from said shoulder means, wherein said edge means is of wedge-shaped configuration in radial cross section.

4. An obturator as set forth in claim 3 wherein the band means is provided with at least a pair of diametrically opposed slots in order to facilitate fracture of the band means and thus separation thereof from the projectile so as to minimize drag of the projectile when it is launched from the tube.

5. An obturator as set forth in claim 1 wherein the ring means is of laminated three-ply construction and wherein each ply is made up of a woven fabric material.

6. An obturator as set forth in claim 1 wherein each bristle-like means is of needle-like configuration and is composed of a suitable grade of ferrous or nonferrous material or an alloy thereof.

7. An obturator as set forth in claim 1 wherein the outer end of each bristle-like means is disposed a predetermined distance above the outer periphery of the band means.

8. An obturator as set forth in claim 1 wherein the outer end of each bristle-like means is disposed at an oblique angle in relation to a tangent to the outer periphery of the band means.

9. An obturator as set forth in claim 8 wherein the outer end of each bristle-like means extends in a counterclockwise direction as viewed from the warhead end of the projectile.

10. An obturator as set forth in claim 1 wherein the alternating series of land and groove means are arranged in a helix about the tube axis between its ends so as to cause spinning of the projectile about its axis when it is launched from the tube.

11. A projectile launching device comprising:

projectile launch tube means, a projectile, base means, the base means for supporting the tube means in a selected upstanding position, said projectile having warhead means disposed at the forward end thereof, casing means affixed to the trailing end of the warhead means, propellant means of the projectile being affixed to the trailing end of the casing means, the interior of said tube means between its ends being provided with alternating series of longitudinally extending land and groove means concentrically arranged about the axis of the tube means, each groove means of the series of groove means having a larger radial extent at one circumferential end than the other so that the groove means at the one circumferential end is deeper than the other, annular shoulder means provided on the projectile and interposed between the casing means and the propellant means, the annular shoulder means facing in a direction toward the propellant end of the projectile, and obturator means mounted about the projectile and disposed against the shoulder means so that the obturator means is retained on the projectile when it is inserted and lowered into the tube means, said obturator means including bristle-like cleaning means disposed about the periphery thereof for wipingly engaging the series of land means so as to cause cleaning of the series of land means of propellant residue as a projectile is lowered into the tube after launching a previously inserted projectile therefrom.

12. A device as set forth in claim 11 wherein the projectile is provided with band means interposed between and spaced from the annular shoulder means and warhead means; wherein said band means on the outer periphery thereof is provided with a series of circumferentially spaced rib means, and wherein each rib means of the series thereof are arranged in a helix between the longitudinal ends of the rib means of the series thereof such that the trailing end of each rib means of the series thereof leads the forward end of each rib means of the series thereof when the rib means are viewed from the forward end of the projectile.

13. A device as set forth in claim 12 wherein the alternating series of land and groove means of the tube means are arranged in a helix that extends longitudinally between the ends of the tube means and wherein the helix of the alternating series of land and groove means substantially corresponds to the helix of the series of rib means.

14. A device as set forth in claim 13 wherein diametrically opposed rib means of the series thereof have a diameter greater than diametrically opposed groove means of the series thereof of the tube means at the narrower circumferential end thereof but have a diameter less than diametrically opposed groove means of the series thereof of the tube means at the deeper circumferential end thereof, and wherein each rib means is arranged in sliding engagement with its associated longitudinal extending interior surface portions of the tube means at the deeper circumferential end of the associated groove means.

15. A device as set forth in claim 14 wherein the outer major surface of each rib means of the series thereof is of planar configuration throughout its extent, wherein the outer major surface of each rib means in radial section is tapered from one circumferential edge to the other such that the forward circumferential edge of each rib means is of greater radial extent than the trailing circumferential edge thereof as viewed from the warhead end of the projectile, and wherein the forward circumferential edge of each rib means is arranged in sliding engagement with its associated longitudinal interior surface portions of the tube means at the deeper circumferential end of the associated groove means when the projectile is inserted in the tube means.

16. A device as set forth in claim 14 wherein each rib means of the series of rib means in slidably engaging its associated longitudinal extending interior surface portions of the tube means while at the same time the bristle-like means wipingly engage the series of land means is such that both the engaging rib means and the wipingly engaging bristle-like means cooperate to maintain the projectile in its initially oriented and concentric relation to the tube means as the projectile is lowered into the tube means.

17. A device as set forth in claim 11 wherein said bristle-like means are made up of a series of wire-like means about the periphery thereof, wherein the series of wire-like means has an outside diameter greater than the inside diameter of the series of land means, and wherein each one of the wire-like means of the series of wire-like means are selectively spaced relative to each other about the periphery of the obturator means both longitudinally and peripherally thereof so as to present a ribbon of wire-like elements having an appropriate tuft-like cluster of sufficient density for wipingly engaging the series of land means and for simultaneously effectively cleaning the propellant residue buildup from the series thereof when the projectile is inserted in the tube means.

18. A device as set forth in claim 17 wherein each one of the series of wire-like means extend in a counterclockwise direction as viewed from the warhead end of the projectile and wherein each one of the series of wire-like means are arranged at an oblique angle in relation to a tangent that intersects its associated wire-like means at the outer periphery of the obturator means.

19. A method for loading a projectile into an upstanding inclined tube without binding engagement while at the same time cleaning projectile propellant residue from the tube interior, said method comprising the steps of:

maintaining a projectile in its inserted oriented position in relation to the axis of an upstanding inclined tube in the interior thereof, despite the effect of gravity, as the projectile is lowered into the tube while at the same time cleaning the propellant residue buildup from the series of land means of an alternating series of land and groove means provided in the tube interior between its ends all for the purpose of preventing binding engagement of the projectile in the tube.

20. A method as set forth in claim 19 wherein the simultaneous steps of maintaining and cleaning is effected by a projectile having a series of bristle-like means about the periphery thereof and wherein certain bristle-like means of the series thereof wipingly engage the series of land means of the tube.

21. A method as set forth in claim 20 wherein each ot the bristle-like means of the series thereof extend in a counterclockwise direction as viewed from the warhead end of the projectile.

22. A method as set forth in claim 19 wherein the alternating series of land and groove means are arranged in a helix about the tube axis between its ends.

23. A method as set forth in claim 19 wherein the step of maintaining a projectile in its inserted oriented position is also effected by a projectile being provided with a series of circumferentially and relatively spaced rib means about the periphery thereof where each of the rib means slidably engages certain interior surface portions of the tube within each groove means of the series of groove means.

* * * * *